United States Patent
Takada et al.

(10) Patent No.: US 9,108,529 B2
(45) Date of Patent: Aug. 18, 2015

(54) FUEL CELL VEHICLE

(71) Applicant: SUZUKI MOTOR CORPORATION, Shizuoka (JP)

(72) Inventors: Yohei Takada, Shizuoka (JP); Akinori Honma, Shizuoka (JP)

(73) Assignee: SUZUKI MOTOR CORPORATION, Shizuoka (JP)

( * ) Notice: Subject to any disclaimer, the term of this patent is extended or adjusted under 35 U.S.C. 154(b) by 0 days.

(21) Appl. No.: 14/363,006

(22) PCT Filed: Nov. 12, 2012

(86) PCT No.: PCT/JP2012/079238
§ 371 (c)(1),
(2) Date: Jun. 5, 2014

(87) PCT Pub. No.: WO2013/114699
PCT Pub. Date: Aug. 8, 2013

(65) Prior Publication Data
US 2014/0350760 A1     Nov. 27, 2014

(30) Foreign Application Priority Data
Feb. 2, 2012    (JP) .................................. 2012-021006

(51) Int. Cl.
*B60L 9/00*      (2006.01)
*B60L 11/18*     (2006.01)
(Continued)

(52) U.S. Cl.
CPC ........... *B60L 11/1881* (2013.01); *B60L 3/0053* (2013.01); *B60L 11/1803* (2013.01); *B60L*
(Continued)

(58) Field of Classification Search
CPC .................... B60L 11/1881; B60L 11/1887
USPC .......................................................... 701/22
See application file for complete search history.

(56) References Cited

U.S. PATENT DOCUMENTS

| | | | |
|---|---|---|---|
| 8,014,949 B2* | 9/2011 | Bono | ............................ 701/300 |
| 2003/0215681 A1 | 11/2003 | Appt et al. | |
| 2010/0089127 A1* | 4/2010 | Farnsworth | ................ 73/40.5 R |
| 2010/0227240 A1 | 9/2010 | Manabe et al. | |

FOREIGN PATENT DOCUMENTS

| | | |
|---|---|---|
| JP | 2004-4013 A | 1/2004 |
| JP | 2004-214027 A | 7/2004 |

(Continued)

OTHER PUBLICATIONS

International Search Report mailed Feb. 12, 2013 in PCT/JP2012/079238.

*Primary Examiner* — Thomas G Black
*Assistant Examiner* — Luke Huynh
(74) *Attorney, Agent, or Firm* — Rothwell, Figg, Ernst & Manbeck, P.C.

(57) ABSTRACT

An object of the present invention is to reduce power consumption in a storage apparatus that forms a control purpose power supply while making it possible to detect hydrogen, which has been leaked from a fuel cell system during running, even after stopping the vehicle. To accomplish this object, the power supply for a vehicle controller (23) is maintained by allowing a self-holding relay (35) to stay on even after turning off an ignition switch (11). On the other hand, the power supply for the vehicle controller (23) is turned off upon expiry of a predetermined period of time after turning off a propulsion system unless leakage of hydrogen from a fuel cell system (13) is detected.

5 Claims, 3 Drawing Sheets

(51) Int. Cl.
*H01M 8/04* (2006.01)
*B60L 3/00* (2006.01)

(52) U.S. Cl.
CPC . 11/1859 (2013.01); *B60L 11/1883* (2013.01); *B60L 11/1887* (2013.01); *H01M 8/04388* (2013.01); *H01M 8/04447* (2013.01); *H01M 8/04664* (2013.01); *H01M 8/04985* (2013.01); B60L 2210/10 (2013.01); B60L 2250/10 (2013.01); H01M 2250/20 (2013.01); Y02E 60/50 (2013.01); Y02T 10/705 (2013.01); Y02T 10/7216 (2013.01); Y02T 10/92 (2013.01); Y02T 90/32 (2013.01); Y02T 90/34 (2013.01)

(56) References Cited

FOREIGN PATENT DOCUMENTS

| | | | |
|---|---|---|---|
| JP | 2005-124358 A | | 5/2005 |
| JP | 2005-223535 A | | 8/2005 |
| JP | 2005223535 A | * | 8/2005 |
| JP | 2007-134168 A | | 5/2007 |
| JP | 2008-108668 A | | 5/2008 |
| JP | 2009-59570 A | | 3/2009 |
| JP | 2010-135098 A | | 6/2010 |
| JP | 2010-228742 A | | 10/2010 |
| JP | 2012-19607 A | | 1/2012 |

* cited by examiner

FUEL CELL VEHICLE

CROSS REFERENCE TO RELATED APPLICATION

This application is a 35 U.S.C. 371 National Phase Entry Application from PCT/JP2012/079238, filed Nov. 12, 2012, which claims the benefit of Japanese Patent Application No. 2012-021006, filed Feb. 2, 2012, the disclosures of which are incorporated herein in their entirety by reference.

TECHNICAL FIELD

The present invention relates to fuel cell vehicles with an electric motor that receives power generated by a fuel cell system and provides torque to a traction wheel.

BACKGROUND ART

Patent Literature 1 contains disclosure with regard to detection of leakage of hydrogen when a fuel cell system stops generation of power. Patent Literature 2 contains disclosure with regard to detection of leakage of hydrogen when a system is in a dormant state. Patent Literature 3 contains disclosure with regard to a system for detecting an abnormality such as leakage of hydrogen. According to the art disclosed in Patent Literatures 1 to 3, a device for detecting leakage of hydrogen demands that its power supply is always turned on.

PRIOR ART

Patent Literature

Patent Literature 1: JP-A 2005-223535
Patent Literature 2: JP-A 2004-4013
Patent Literature 3: JP-A 2004-214027

SUMMARY OF INVENTION

Problem to be Solved by Invention

Fuel cell vehicles have a fuel cell system (with a hydrogen tank and piping) and an electric motor, in which the electric motor receives power generated by the fuel cell system and provides torque to a traction wheel to propel the vehicle. In such fuel cell vehicles, it is necessary to mount a hydrogen leak sensor for monitoring leakage of hydrogen from the fuel cell system.

However, there is little possibility that leakage of hydrogen, if any, from a fuel cell system can be detected while a fuel cell vehicle is running because of natural ventilation.

Thus, there is a need to enable detection of leakage of hydrogen even after turning off an ignition switch by maintaining power supply for a hydrogen leak senor and a control unit for allowing the hydrogen leak sensor to detect hydrogen even though the ignition switch is turned off after stopping the fuel cell vehicle.

If the power supply for the hydrogen leak sensor and the control unit is maintained for an extended period of time after turning off the ignition switch, the amount of charge in a control purpose storage apparatus for feeding power to them ends up dropping. Thus, there is a fear that the vehicle may not move next time even though the vehicle is caused to start by turning on the ignition switch.

An object of the present invention is to reduce power consumption in a storage apparatus that forms a control purpose power supply while making it possible to detect hydrogen, which has been leaked from a fuel cell system during running, even after stopping the vehicle.

Means to Solve Problem (1) According to one aspect of the present invention, there is provided a fuel cell vehicle including traction wheel, a motor that provides torque to said traction wheel, a fuel cell system that generates power and feeds the power to said motor, and a battery that stores power generated by said fuel cell system to feed the stored power to said motor, characterized by comprising: a hydrogen leak sensor configured to detect whether or not there is hydrogen leaked from said fuel cell system; a first control section configured to control said fuel cell system and said battery, and to determine whether or not there is leakage of said hydrogen according to said hydrogen leak sensor; a storage unit configured to store power to be fed to said hydrogen leak sensor and said first control section; and a second control section configured to maintain supply of power from said storage unit to said hydrogen leak sensor and said first control section for a predetermined period of time on turning off an ignition switch unless leakage of said hydrogen is detected by said hydrogen leak sensor and thereafter stop the supply of power.

(2) Another aspect of the present invention according to the aspect (1) is characterized by further comprising: a first annunciator configured to give a notice of the fact of the leakage while said hydrogen leak sensor continues to detect hydrogen leaked from said fuel cell system after turning off the ignition switch.

(3) Another aspect of the present invention according to the aspect (2) is characterized by further comprising: a charge detection sensor configured to detect the amount of charge in said storage unit, and in that said second control section is configured to stop the supply of power to said hydrogen leak sensor and said first control section when the amount of charge detected by said charge detection sensor is less than a predetermined fixed value even during said predetermined period of time or even when said first annunciator continues to give the notice.

(4) Another aspect of the present invention according to the aspect (1) is characterized by further comprising: a history storage section configured to store, as history, the fact of the leakage of hydrogen when said hydrogen leak sensor detects hydrogen leaked from said fuel cell system after turning off the ignition switch; and a second annunciator configured to give a notice of the stored fact when the history of the fact of said leakage of hydrogen is stored in said history storage part on turning on the ignition switch.

(5) Another aspect of the present invention according to the aspect (4) is characterized by further comprising: a vehicle-start disabling section configured to disable the vehicle to prevent it from being started upon finding that said history storage part stores, as history, the fact of said leakage of hydrogen on turning on the ignition switch.

Effect of Invention

According to the aspect (1), it is possible to reduce power consumption in the storage unit that generates control power while enabling detection of hydrogen leaked from the fuel cell system during running even after stopping the vehicle.

According to the aspect (2), it is possible for all persons around the fuel cell vehicle to find that hydrogen is being leaked from the fuel cell system and to appropriately address this problem.

According to the aspect (3), it is possible to prevent overdischarge from the storage unit.

According to the aspect (4), it is possible to remind the vehicle occupant(s) to notice the fact of leakage of hydrogen during the off-state of the ignition switch on subsequently turning on the ignition switch.

According to the aspect (5), since it is highly likely that leakage of hydrogen may take place again if the vehicle is allowed to start even though the leakage of hydrogen during running has ceased once, it is possible to prevent reoccurrence of leakage of hydrogen by disabling the vehicle to prevent it from being started if there is the fact of leakage of hydrogen during the off-state of the ignition switch.

DESCRIPTION OF EMBODIMENT(S)

One embodiment according to the present invention is described below.

Figure 1:
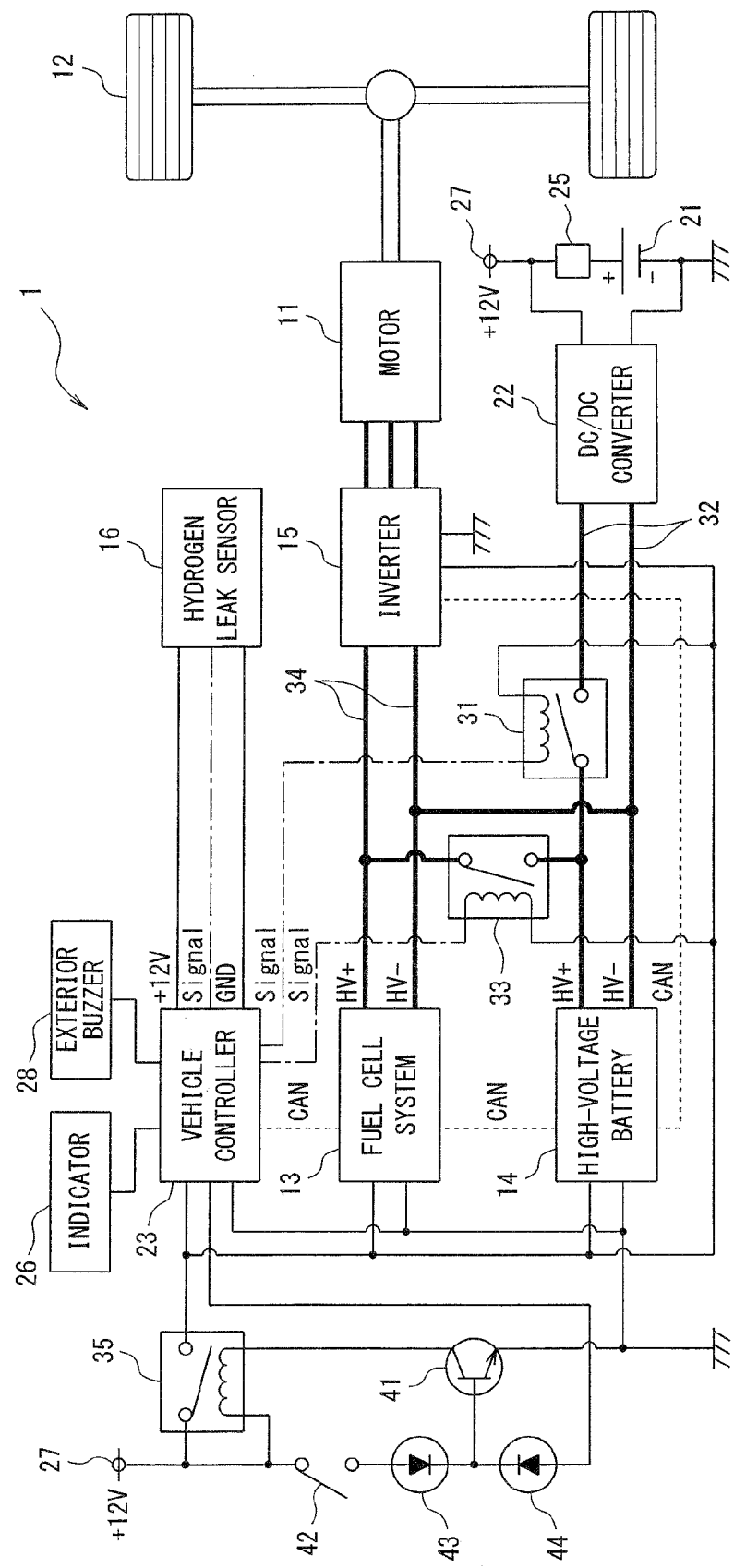
FIG. 1 is a block diagram depicting electrical connections for one embodiment of a fuel cell vehicle according to the present invention.

FIG. 1 is a block diagram depicting electrical connections for a fuel cell vehicle 1 according to the present embodiment. With respect to the fuel cell vehicle 1, an electric motor 11 provides torque to a set of traction wheels 12. A fuel cell system 13 generates power. A high voltage battery 14 stores the power generated by the fuel cell system 13. An inverter 15 converts DC power that is generated by the fuel cell system 13 or charged by the high voltage battery 14 into AC power to use the AC power to run the electric motor 11.

A hydrogen leak sensor 16 is a sensor configured to detect leakage of hydrogen used in the fuel cell system 13.

A 12-volt battery 21 is a battery to feed a 12-volt DC power supply 27, as a control purpose power supply, to each part, thereby constituting a storage unit. The high voltage battery 14 is used, as a power supply, to charge the 12-volt battery 21 through a DC/DC converter 22. A voltage sensor 25 detects voltage of the 12-volt battery 21 and functions as a charge detection sensor for detecting charge in the 12-volt battery 21.

The vehicle controller 23 is a control unit configured around a microcomputer and brings each part under concentrated control. Using CAN (Controller Area Network), the vehicle controller 23 can communicate with equipments such as fuel cell system 13, high voltage battery 14, and inverter 15 and thus have control of such equipments. In view of its control function, the vehicle controller 23 embodies a first control section, a second control section, and a vehicle-start disabling section. In view of its non-volatile memory, the vehicle controller 23 embodies a history storage section.

An indicator 26 operates on a control signal from the vehicle controller 23 and can display various messages to attract attention of a vehicle driver. A vehicle exterior buzzer 28 can issue an alarm. The vehicle exterior buzzer 28 embodies a first annunciator. The indicator 26 embodies a second annunciator.

A DC/DC relay 31 is a relay used to connect or disconnect a set of lines 32 interconnecting the high voltage battery 14 and DC/DC converter 22. When the DC/DC relay 31 is turned on, the high voltage battery 14 can provide power to charge the 12-volt battery 21.

A high voltage relay 33 is a relay used to connect one set of lines 34 interconnecting the fuel cell system 13 and inverter 15 to the other set of lines 32 or disconnect one set from the other set. When the high voltage relay 33 is turned on, the fuel cell system 13 provides generated power to charge the high voltage battery 14 and the high voltage battery 14 is allowed to provide power to the electric motor 11. The vehicle controller 23 provides a control signal to turn on or off the high voltage relay 33.

A self-holding relay 35 is a relay used to provide supply of a control purpose power from a DC power supply 27 to equipments such as vehicle controller 23, fuel cell system 13, high voltage battery 14 and inverter 15 or stop the supply. The vehicle controller 23 provides a control signal to turn on or off the self-holding relay 35.

A switching element 41 including transistor(s) is an element used to turn on or off the self-holding relay 35. When an ignition switch 42 for the fuel cell vehicle 1 is turned on, the DC power supply 27 is allowed to apply a voltage to a gate of the switching element 41, turning on the switching element 41. This turns on the self-holding relay 35 to provide the supply of power to equipments such as vehicle controller 23. Additionally, even when the ignition switch 42 is turned off, the vehicle controller 23 may provide a control signal to the gate of the switching element 41 via a diode 44, thereby turning on the switching element 41. This turns on the self-holding relay 35.

The hydrogen leak sensor 16 receives power from the DC power supply 27 via the vehicle controller 23, is powered by a control signal from the vehicle controller 23 and is grounded via the vehicle controller 23. A detection signal from the voltage sensor 25 is also captured by the vehicle controller 23.

Figure 2:
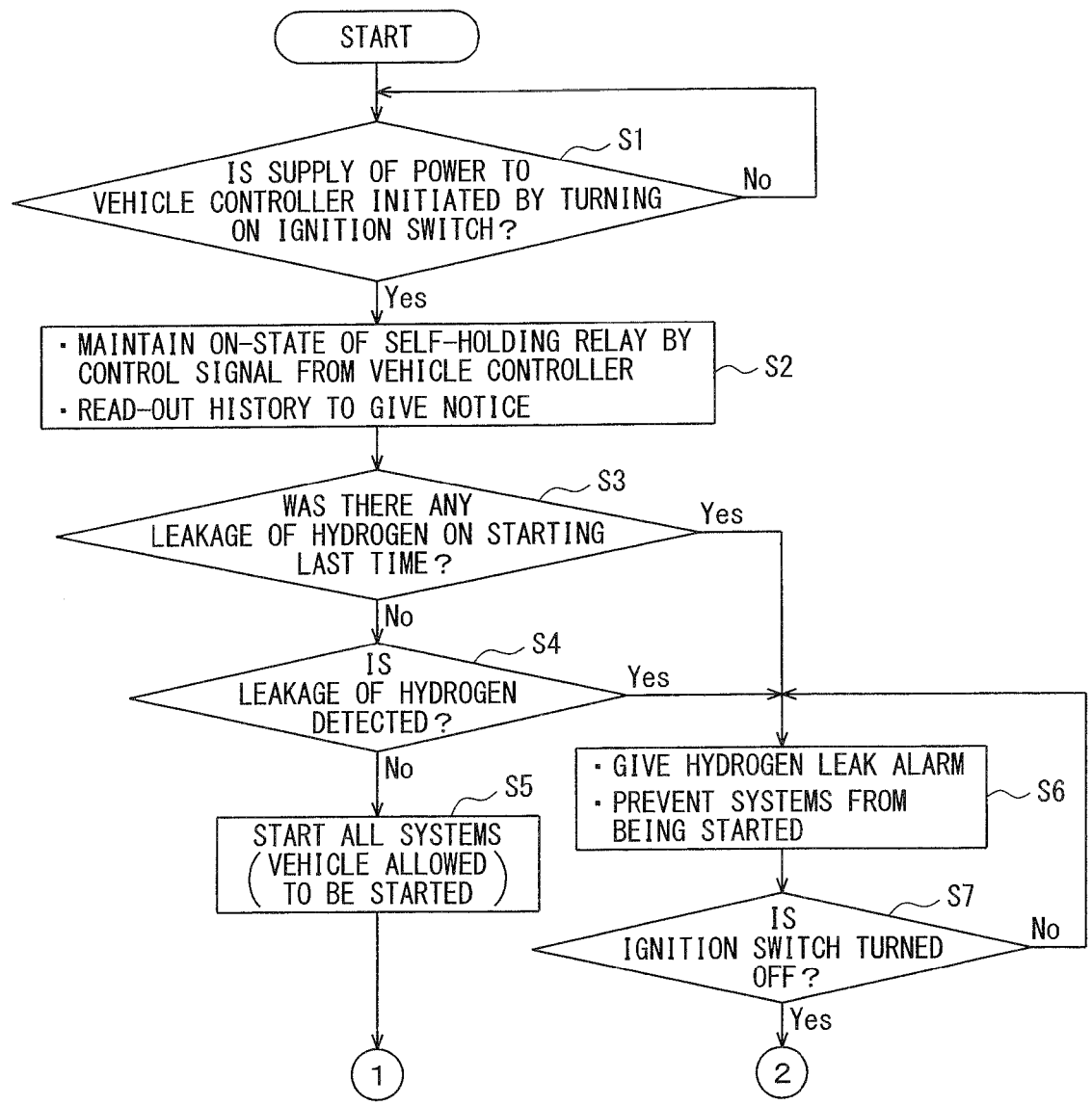
FIG. 2 is a flowchart representing a control process conducted by a vehicle controller in the one embodiment of fuel cell vehicle according to the present invention.
Figure 3:
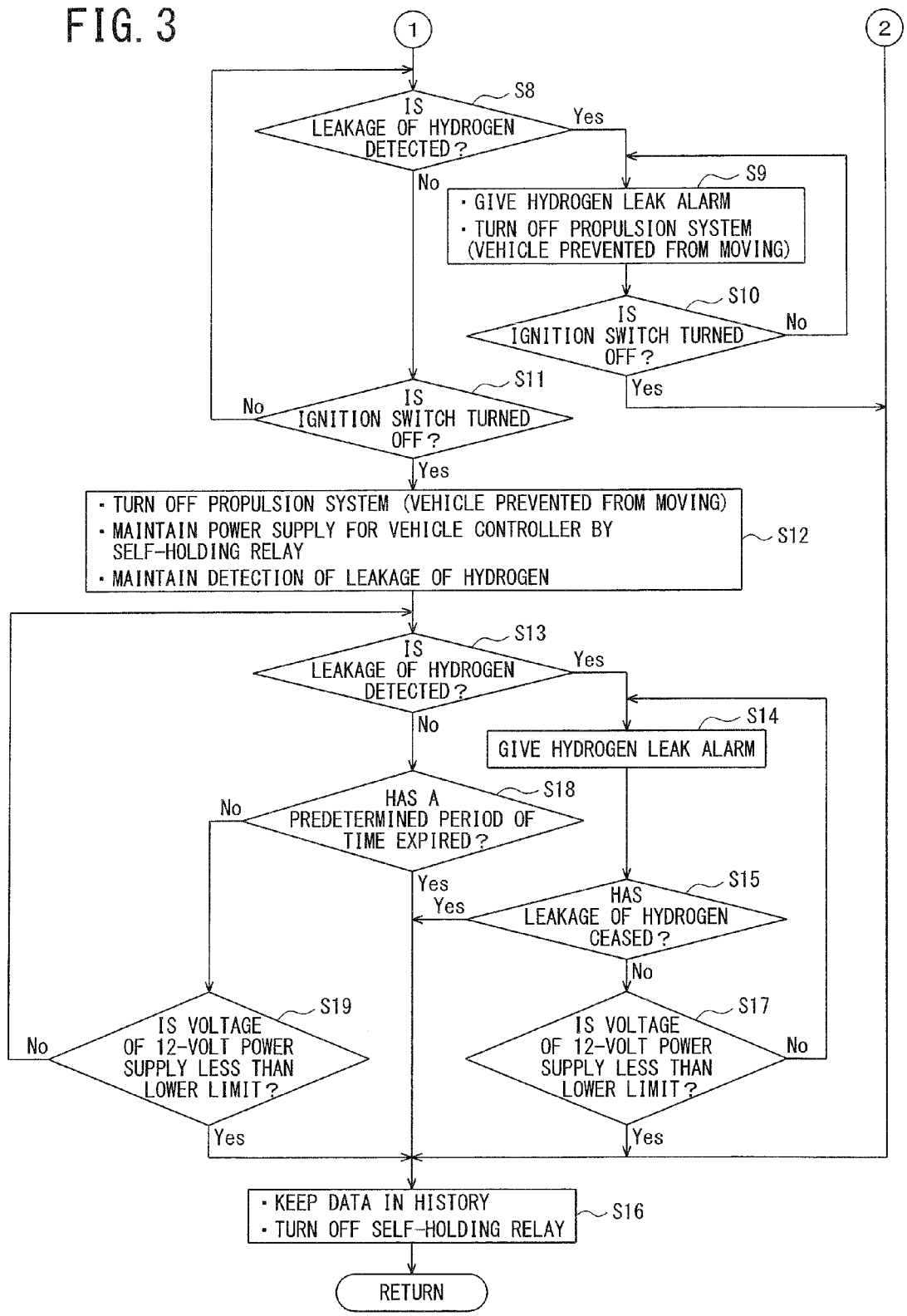
FIG. 3 is a flowchart representing the control process conducted by the vehicle controller in the one embodiment of fuel cell vehicle according to the present invention.

Next, contents of control executed by the vehicle controller 23 are described. FIGS. 2 and 3 are flowcharts representing the control contents.

Upon supply of power to the vehicle controller 23 from the DC power supply 27 initiated by turning on the ignition switch 42 to apply a voltage to a gate of the switching element 41 (YES flow line from step S1), the vehicle controller 23 initiates output of a control signal to the gate of the switching element 41 to maintain the on-state of the self-holding relay 35 (step S2), thereby maintaining the on-state of power supply for the vehicle controller 23. There is stored in a volatile memory, as history, whether or not there is hydrogen leaked from the fuel cell system 13 during the off-state of the ignition switch 42 last time, as determined according to the hydrogen leak sensor 16 (the details being given later). The vehicle controller 23 reads out information stored as history and allows the indicator 26 to indicate an alarm to give notice of the alarm when the history of leakage of hydrogen is recorded (step S2). Not only visual indications on the indicator 26 but also their alternatives such as sounds suffice to give a notice of the alarm.

The vehicle controller 23 determines based on the read-out history whether or not there was leakage of hydrogen from the fuel cell system 13 on starting the vehicle 1 last time (step S3). When there was no leakage of hydrogen (NO flow line from step S3), the vehicle controller 23 determines whether or not leakage of hydrogen from the fuel cell system 13 is detected by the hydrogen leak sensor 16 (step S4). When leakage of hydrogen is not detected (NO flow line from step S4), the vehicle controller 23 starts all on-board systems in the vehicle 1 to bring the vehicle 1 ready to move (step S5). This causes electric power from the fuel cell system 13 and high voltage battery 14 ready to run the motor 11.

When the before-mentioned history indicates that leakage of hydrogen from the fuel cell system 13 took place on starting the vehicle 1 last time (YES flow line from step S3) or when leakage of hydrogen is detected after turning on the ignition switch 42 (YES flow line from step S4), the vehicle controller 23 causes the indicator 26 to produce an indication to give a hydrogen leak alarm (step S6). Additionally, it prevents the systems in the vehicle 1 from being started (step S6). This means that the vehicle controller 23 prevents supply of power to the motor 11 from the fuel cell system 13 or the high voltage battery 14, thereby disabling the vehicle 1 to prevent it from being started. When, subsequently, the ignition switch 42 is turned off (YES flow line from step S7), the vehicle controller 23 stores the occurrence of abnormality that leakage of hydrogen from the fuel cell system 13 has been detected, as history, in the volatile memory of the vehicle controller 23 and turns off the self-holding relay 35 by turning off the control signal fed to the switching element 41 (step S16), thereby turning off the vehicle controller 23 itself.

After bringing the vehicle 1 ready to move by starting all systems in the vehicle 1 (step S5), upon detecting leakage of hydrogen with the hydrogen leak sensor 16 (YES flow line from step S8), the vehicle controller 23 causes the indicator 26 to produce an indication to give a hydrogen leak alarm (step S9). Additionally, in this case, the vehicle controller 23 turns off the propulsion system of the vehicle 1 to disable the vehicle 1 to prevent it from being started (step S9). More precisely, the vehicle controller 23 stops the motor 11 and supply of power to the motor 11 from the fuel cell system 13 or high voltage battery 14. Further, upon turning off the ignition switch 42 (YES flow line from step S10), the vehicle controller 23 stores, as history, the occurrence of abnormality that leakage of hydrogen from the fuel cell system 13 is detected in non-volatile memory of the vehicle controller 23 and turns off the self-holding relay 35 by turning off the control signal to the switching element 41 (step S16), thereby turning off the vehicle controller 23 itself as well.

Upon detecting no leakage of hydrogen with the hydrogen leak sensor 16 (NO flow line from step S8) and turning off the ignition switch 42 (YES flow line from step S11), the vehicle controller 23 turns off the propulsion system of the vehicle 1 to prevent the vehicle 1 from moving (step S12). More precisely, the vehicle controller 23 stops the motor 11 and the supply of power to the motor 11 from the fuel cell system 13 or high voltage battery 14. However, in this case, the vehicle controller 23 keeps on transmitting the control signal to the switching element 41 to maintain the on-state of the self-holding relay 35, thereby maintaining the power supply for the vehicle controller 23 (step S12). This allows the hydrogen leak sensor 16 to stay in an operable state to detect leakage of hydrogen from the fuel cell system 13 (step S12).

In the event of detecting, in this state, leakage of hydrogen from the fuel cell system 13 (YES flow line from step S13), the vehicle controller 23 allows the exterior buzzer 28 to beep to notify those people around the fuel cell vehicle 1 (step S14). Subsequently, upon finding that leakage of hydrogen from the fuel cell system 13 is no longer detected and the leakage of hydrogen has ceased (YES flow line from step S15), the vehicle controller 23 stores, as history, the occurrence of abnormality that leakage of hydrogen from the fuel cell system 13 has been detected in the volatile memory of the vehicle controller 23 and turns off the self-holding relay 35 by turning off the control signal to the switching element 41 (step S16), thereby turning off the vehicle controller 23 itself as well.

In the event of finding that leakage of hydrogen continues to be detected and the leakage of hydrogen has not ceased yet (NO flow line from step S15), the vehicle controller 23 determines whether or not voltage of the 12-volt battery 21 detected by the voltage sensor 25 is less than a predetermined lower limit (step S17). When the voltage of the 12-volt battery 21 is less than the lower limit (YES flow line from step S17), the vehicle controller 23 stores, as history, the occurrence of abnormality that leakage of hydrogen from the fuel cell system 13 has been detected in the volatile memory of the vehicle controller 23 and turns off the self-holding relay 35 by turning off the control signal to the switching element 41 (step S16), thereby turning off the vehicle controller 23 itself as well.

On the other hand, in the event of detecting no leakage of hydrogen from the fuel cell system 13 (NO flow line from step S13), the vehicle controller 23 determines whether or not a predetermined period of time, which begins with turning off the propulsion system at step S12, has expired (step S18). Upon expiry of the predetermined period of time (YES flow line from step S18), the vehicle controller 23 stores, as history, the fact that no leakage of hydrogen from the fuel cell system 13 has been detected in the volatile memory of the vehicle controller 23 itself and turns off the self-holding relay 35 by turning off the control signal to the switching element 41 (step S16), thereby turning off the vehicle controller 23 itself as well. On the other hand, upon finding that the predetermined period of time has not expired (NO flow line from step S18), the vehicle controller 23 continues to detect leakage of hydrogen from the fuel cell system 13 at step S13 until voltage of the 12-volt DC power supply 27 will become less than the predetermined lower limit (YES flow line from step S19). This predetermined period of time, i.e. a period of time needed for completing detection of leakage of hydrogen, is experimentally calculated.

According to the previously described fuel cell vehicle 1, while maintaining power supply for the vehicle controller 23 (step S12) even after turning off the ignition switch 42 (YES flow line from step S11), the vehicle controller 23 turns off the power supply for the vehicle controller 23 upon expiry of the predetermined period of time, unless leakage of hydrogen from the fuel cell system 13 is detected (NO flow line from step S13), after turning off the propulsion system (YES flow line from step S18). This can reduce power consumption of the 12-volt battery 21 forming the DC control purpose power supply 27, while allowing detection of hydrogen, generated by the fuel cell system 13 during running of the fuel cell vehicle 1, even after stopping the fuel cell vehicle 1.

Additionally, the vehicle controller 23 can notify, as a general rule, those people around the fuel cell vehicle 1 of an alarm indicating occurrence of leakage of hydrogen (step S14, NO flow line from step S15) upon detecting leakage of hydrogen (YES flow line from step S13) unless the leakage of hydrogen leak ceases, letting the vehicle occupant(s) to find that hydrogen is being leaked from the fuel cell system 13, making it possible for them to appropriately address this problem.

Further, even during giving the hydrogen leak alarm (step S14, NO flow line from step S15), the vehicle controller 23 turns off the power for the vehicle controller 23 as well when voltage of the 12-volt battery 21 is less than the predetermined lower limit (YES flow line from step S17) and thus prevents over discharge from the 12-volt battery 21.

In addition, since it stores, as history, the fact of leakage of hydrogen (step S16) and allows the indicator 26 to indicate an alarm to give notice of the alarm (step S2), the vehicle controller 23 can notify the vehicle occupant(s) of the fact of leakage of hydrogen to cause them to notice upon turning on the ignition switch 42 next time.

Even though leakage of hydrogen from the fuel cell system 13 during running of the vehicle 1 has ceased once, it is highly likely that leakage of hydrogen may take place again if the vehicle 1 starts. Leakage of hydrogen can be prevented because the vehicle controller 23 disables the vehicle 1 to prevent it from being started (step S6) upon finding the fact of leakage of hydrogen during the off-state of the ignition switch 42 after starting the vehicle 1 last time (YES flow line from step S3).

Although the vehicle controller 23 keeps on activating the self-holding relay 35 for a certain period of time (step S18), a capacitor may be provided, charged from the 12-volt battery 21 and used as power supply for the vehicle controller 23 after turning off the ignition switch 42. This is because the 12-volt battery 21 is no more depleted by turning off the vehicle controller 23 when the capacitor is depleted after turning off the ignition switch 42. If sufficient capacity of the 12-volt battery 21 required for detecting leakage of hydrogen is not available due to specifications of the vehicle 1, a 12-volt power supply provided by reducing voltage from the high voltage battery 14 can be used to perform the same control. In addition, even if a vehicle does not have a 12-volt battery 21, a 12-volt power supply provided by reducing voltage from the high voltage battery 14 can be used to perform the same control.

DESCRIPTION OF REFERENCE SYMBOLS

11 motor
12 traction wheel
13 fuel cell system
14 high voltage battery
16 hydrogen leak sensor
21 12-volt battery
23 vehicle controller
25 voltage sensor
26 indicator
35 self-holding relay
27 DC power supply
41 switching element
42 ignition switch

What is claimed is:

1. A fuel cell vehicle including traction wheel, a motor that provides torque to said traction wheel, a fuel cell system that generates power and feeds the power to said motor, and a battery that stores power generated by said fuel cell system to feed the stored power to said motor, characterized by comprising:
a hydrogen leak sensor configured to detect whether or not there is hydrogen leaked from said fuel cell system;
a first control section configured to control said fuel cell system and said battery, and to determine whether or not there is leakage of said hydrogen according to said hydrogen leak sensor;
a storage unit configured to store power to be fed to said hydrogen leak sensor and said first control section; and
a second control section configured to maintain supply of power from said storage unit to said hydrogen leak sensor and said first control section for a predetermined period of time on turning off an ignition switch unless leakage of said hydrogen is detected by said hydrogen leak sensor and thereafter stop the supply of power.

2. The fuel cell vehicle according to claim 1, characterized by further comprising:
a first annunciator configured to give a notice of the fact of the leakage while said hydrogen leak sensor continues to detect hydrogen leaked from said fuel cell system after turning off the ignition switch.

3. The fuel cell vehicle according to claim 1, characterized by further comprising:
a first annunciator configured to give a notice of the fact of the leakage while said hydrogen leak sensor continues to detect hydrogen leaked from said fuel cell system after turning off the ignition switch; and
a charge detection sensor configured to detect the amount of charge in said storage unit, and in that
said second control section is configured to stop the supply of power to said hydrogen leak sensor and said first control section when the amount of charge detected by said charge detection sensor is less than a predetermined fixed value even during said predetermined period of time or even when said first annunciator continues to give the notice.

4. The fuel cell vehicle according to claim 1, characterized by further comprising:
a history storage section configured to store, as history, the fact of the leakage of hydrogen when said hydrogen leak sensor detects hydrogen leaked from said fuel cell system after turning off the ignition switch; and
a second annunciator configured to give a notice of the stored fact when the history of the fact of said leakage of hydrogen is stored in said history storage part on turning on the ignition switch.

5. The fuel cell vehicle according to claim 1, characterized by further comprising:
a history storage part configured to store, as history, the fact of the leakage of hydrogen when said hydrogen leak sensor detects hydrogen leaked from said fuel cell system after turning off the ignition switch; and
a second annunciator configured to give a notice of the stored fact when the history of the fact of said leakage of hydrogen is stored in said history storage part on turning on the ignition switch; and
a vehicle-start disabling section configured to disable the vehicle to prevent it from being started upon finding that said history storage part stores, as history, the fact of said leakage of hydrogen on turning on the ignition switch.

* * * * *